(12) United States Patent
Caution et al.

(10) Patent No.: US 9,703,448 B2
(45) Date of Patent: Jul. 11, 2017

(54) SYSTEMS, DEVICES, AND METHODS FOR DISTRIBUTED PROCESSING FOR PREAUTHORIZED PAYMENT

(71) Applicant: Wal-Mart Stores, Inc., Bentonville, AR (US)

(72) Inventors: Stephen Tyler Caution, Bentonville, AR (US); Douglas Jahe Ryner, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 15/143,433

(22) Filed: Apr. 29, 2016

(65) Prior Publication Data

US 2016/0321474 A1    Nov. 3, 2016

Related U.S. Application Data

(60) Provisional application No. 62/155,106, filed on Apr. 30, 2015.

(51) Int. Cl.
  *G06K 15/00* (2006.01)
  *G06F 3/0481* (2013.01)
  (Continued)

(52) U.S. Cl.
  CPC ......... *G06F 3/0481* (2013.01); *G06Q 20/206* (2013.01); *G06Q 20/3224* (2013.01)

(58) Field of Classification Search
  USPC ...................... 235/383, 380, 375; 705/17, 44
  See application file for complete search history.

(56) References Cited

U.S. PATENT DOCUMENTS 5,649,114 A  7/1997  Deaton et al.
6,484,939 B1  11/2002  Blaeuer
(Continued)

FOREIGN PATENT DOCUMENTS

WO    2014162296 A1    10/2014

OTHER PUBLICATIONS

[No Author Listed] How to use Tesco Scan as you Shop, video available at https://www.youtube.com/watch?v=IUK4IX3TuA0, published by Tesco, Aug. 28, 2013.
(Continued)

*Primary Examiner* — Ahshik Kim
(74) *Attorney, Agent, or Firm* — McCarter & English LLP; David R. Burns; John S. Curran

(57) ABSTRACT

Provided herein are methodologies, systems, apparatus, and non-transitory computer-readable media for configuring a graphical user interface of an electronic display device for enabling preauthorized payment of products or services using distributed processing. A customer may interact with a kiosk or terminal to identify themselves and initiate the process for dynamically computing an active preauthorization limit. Items may then be added to the customer's balance at various point of sale terminals or scanning locations within the facility. Total cost of the items is compared to the active preauthorization limit. Once the customer is finished shopping, a GUI can present them with an authorization screen showing their shopping balance and requesting authorization. The user can interact with the GUI to approve the total via the GUI without the need to produce their card or payment method at checkout.

37 Claims, 5 Drawing Sheets

(51) Int. Cl.
*G06Q 20/20* (2012.01)
*G06Q 20/32* (2012.01)

(56) References Cited

U.S. PATENT DOCUMENTS

| | | |
|---|---|---|
| 6,910,697 B2 | 6/2005 | Varatharajah et al. |
| 8,308,059 B2 * | 11/2012 | Granucci ............... G06K 19/07 |
| | | 235/379 |
| 2013/0110678 A1 | 5/2013 | Vigier et al. |
| 2014/0164175 A1 | 6/2014 | Kitlyar |
| 2015/0051977 A1 * | 2/2015 | Lyman ............... G06Q 30/0261 |
| | | 705/14.58 |
| 2015/0348029 A1 * | 12/2015 | Van Os .................. G06Q 20/40 |
| | | 705/44 |

OTHER PUBLICATIONS

[No Author Listed] Self-scanning, video available at https://www.youtube.com/watch?v=nsIVfL3RzWo, published by Tom Ruseler, Dec. 6, 2013.

[No Author Listed] Smart Scan App in Carrefour, video available at https://www.youtube.com/watch?v=JPcYm6o-LnE, published by Smart Scan App in Carrefour, Mar. 23, 2014.

* cited by examiner

SYSTEMS, DEVICES, AND METHODS FOR DISTRIBUTED PROCESSING FOR PREAUTHORIZED PAYMENT

RELATED APPLICATIONS

This application claims priority to U.S. Provisional Patent Application Ser. No. 62/155,106 entitled "SYSTEMS, DEVICES, AND METHODS FOR PREAUTHORIZED PAYMENT," filed on Apr. 30, 2015, the content of which is hereby incorporated by reference in its entirety.

BACKGROUND OF THE TECHNOLOGY

In general, retail establishments or businesses may allow a customer to checkout and pay for items at a checkout station operated by a cashier, or at a self-checkout station that allows the customer to personally scan and pay for items. Certain businesses allow a user to pay for products or services at various point of sale terminals that correspond to different departments within the business.

SUMMARY

In accordance with exemplary embodiments, a method of configuring a graphical user interface of an electronic display device for facilitating preauthorized payment of products and/or services is disclosed. The method includes receiving, via a user-machine interface, identification information associated with an individual. The method also includes computing, using a processor, a preauthorized limit corresponding to the individual, based on the data indicative of the identification information. The method further includes authorizing a payment amount corresponding to the preauthorized limit. The method further includes receiving, via an electronic scanning device, information associated with one or more product or service. The method also includes comparing, using the processor, a total cost of the one or more product or service to the preauthorized limit, to verify an authorized status of the total cost of the one or more product or service to provide a verified cost. The method further includes rendering a graphical user interface on an electronic display device, the graphical user interface including an indication of the verified cost of the one or more products or services having the authorized status, and a graphical prompt requesting approval from the individual of the verified cost of the one or more products or services.

In some examples, the graphical user interface is further configured to receive an approval from the individual of the verified cost of the one or more products or services. In some examples, receiving information associated with the one or more product or service includes receiving information at multiple electronic scanning devices located at distinct point of sale terminals within an enterprise. In some examples, receiving information associated with the one or more product or service at one point of sale terminal initiates a database query requesting information associated with products or services scanned at other point of sale terminals within the enterprise. In some examples, the user-machine interface includes an IR reader, wireless access point, RFID reader, magnetic card reader, QR code reader, biometric scanner, NFC detector, Bluetooth detector, low energy Bluetooth detector, wand scanner, integrated-circuit chip reader, or geolocation device. In some examples, the electronic scanning device includes an RFID reader, a barcode reader, a QR code reader, Bluetooth detector, low energy Bluetooth detector, wand scanner, integrated-circuit chip reader, tunnel scanning device, or a NFC reader. In some examples, the preauthorized limit is calculated based on the individual's previous shopping history or a preset budget created by the individual. In some examples, receiving data indicative of identification information associated with the individual automatically initiates the computation of the preauthorized limit. In some examples, the preset budget is updated after each purchase made by the individual. In some examples, the graphical user interface further includes an indication of whether the cost of the one or more product or service exceeds the preauthorized limit. In some examples, the user-machine interface receives identification information associated with the individual by detecting a proximity of an electronic marker of the individual to a proximity locator.

Any combination or permutation of the above examples is envisioned. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present disclosure will be more fully understood from the following description of exemplary embodiments when read together with the accompanying drawings, in which.

DETAILED DESCRIPTION

Figure 1:
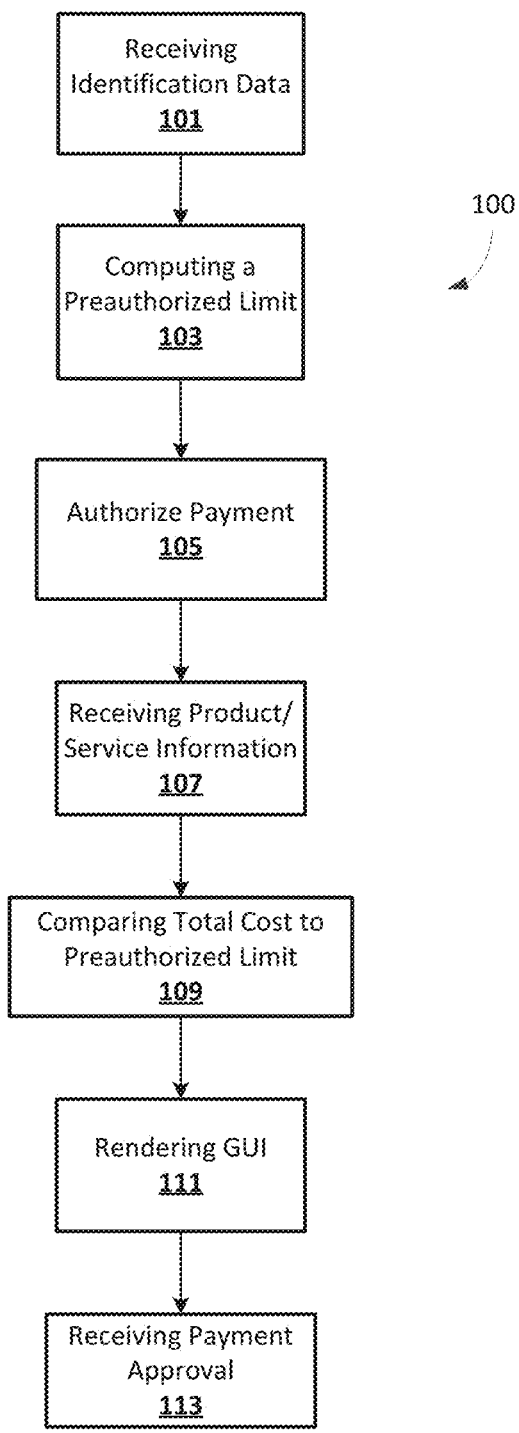
FIG. 1 is a flowchart illustrating an exemplary method of configuring a graphical user interface of an electronic display device, according to embodiments of the present disclosure.

Following below are more detailed descriptions of various concepts related to, and embodiments of, inventive methods, apparatus, and systems for preauthorized purchasing of products or services within an enterprise. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

Example methodologies, systems, apparatus, and non-transitory computer-readable media are described herein to facilitate configuring a graphical user interface of an electronic display device for enabling preauthorized payment of products and/or services within an enterprise. Specifically, by preauthorizing a certain payment amount at the beginning of the customer or individual's shopping experience and allowing a user to merely authorize the transaction at the end, the individual no longer needs to present their payment means again at checkout, thus reducing checkout times and customer queues.

According to exemplary embodiments, an individual can input identification information at a user-machine interface, such as an electronic kiosk located at an entrance of a store, in order to begin the preauthorization process. The user machine interface may utilize near field communication (NFC), Bluetooth, low energy Bluetooth, or geolocation technology, for example, or it may include an RFID reader, magnetic card reader, QR code reader, biometric scanner, wand scanning device, wireless access point, infrared (IR) detector, integrated circuit chip reader, or any other suitable user-machine interface device regardless of mobility or form factor. Examples of chip readers include Chip and PIN readers and Europay, Mastercard, and Visa (EMV) standard chip readers.

The identification information may be transmitted from the individual to the system via the individual's bank card, smart phone, smart wallet, or other device that can transmit identification information corresponding to the individual.

The preauthorized limit can be computed based on, for example, the individual's previous shopping history, a budget that can be managed by the individual or some other third party, statistical shopping data corresponding to other customers within the individual's demographic, statistical data corresponding to customers within a particular geographical region, actual items being added during the individual's visit to the store, etc. Once the preauthorized shopping limit is computed, the individual's account number or other payment information may be used to set aside the preauthorized amount for this particular transaction. The preauthorization may remain active or open until the individual approves or declines the final transaction. The individual is thus able to pay for goods or services from multiple departments within an enterprise all on a single balance and using a single authorization command at checkout.

Once a preauthorized limit is computed, the individual can begin shopping within the enterprise. In some examples, the individual can scan or otherwise input identification relating to products or services from various departments within an enterprise. For example, the individual may wish to pay for products or services from a gas station, pharmacy, jewelry department, lawn and garden department, automotive department, etc., each of which may have their own point of sale or checkout locations. In some instances, the individual can scan items using a mobile scanning device, while in other instances the individual can collect items in a shopping cart and scan them at a point of sale terminal or scanning station. The individual may be provided with a chit or barcode to identify themselves at a subsequent point of sale terminal if the individual wishes to continue shopping. The individual may scan this chit at a scanning station or point of sale terminal at any department within the enterprise in order to add or remove items from their balance or tab.

In some examples, information relating to the products or services an individual wishes to purchase may be input via a NFC reader, Bluetooth reader, low energy Bluetooth reader, wand scanning device, wireless access point, IR detector, integrated circuit chip reader, tunnel scanning device, or any other suitable scanning device regardless of form factor. The user-machine interface and/or electronic scanning device used to input information relating to the products or services may include one or more mobile devices that are not fixed to a predetermined position within a store. For example, products may be sold off-site and the user-machine interface and/or electronic scanning device may include a mobile electronic device or node configured for implementing any of the processes and methods described herein.

Once the individual has finished adding items to their balance, an electronic display device can render a graphical user interface (GUI) that displays the items currently on the individual's balance and allows the individual to approve or decline the transaction. In one particular example, the GUI can display the products and/or services being purchased by the customer, along with an itemized listing of the price of those products and/or services. The GUI can also display the preauthorized limit, as well as an indication of whether the current balance exceeds that preauthorized limit. If the balance is below the preauthorized limit and the individual approves of the purchase, the checkout process can be completed with a single approval command by the individual. In this way, a customer can save time by not having to remove and use their payment means in order to complete the transaction. This benefit is particularly helpful where an individual added items to their balance at various departments within an enterprise. Additionally, moving the payment processing from the end of the shopping experience to the beginning further reduces checkout times.

Provided herein are example methodologies, systems, apparatus, and non-transitory computer-readable media for configuring a graphical user interface of an electronic device to facilitate preauthorized purchasing of products or services within an enterprise. Based on the example methodologies, systems, apparatus, and non-transitory computer-readable media herein, the Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart illustrating an example method 100 for configuring a graphical user interface of an electronic display device to facilitate preauthorized purchasing of products or services within an enterprise, according to embodiments of the present disclosure. In step 101, data indicative of identification information associated with an individual or customer is received at a user-machine interface. The user-machine interface may utilize an IR reader, wireless access point, RFID reader, magnetic card reader, QR code reader, biometric scanner, near field communication (NFC) detector, Bluetooth detector, low energy Bluetooth detector, wand scanner, integrated-circuit chip reader, or geolocation device, etc. The user-machine interface may receive data indicative of identification information associated with an individual via a proximity locator that can detect an electronic marker associated with the individual. In one example, the electronic marker and proximity locator may utilize one or more of the technologies described in reference to the user-machine interface.

Once an individual customer has been identified, in step 103 a preauthorized limit is computed corresponding to the individual and based on the identification information received in step 101. The preauthorized limit can be computed based on, for example, the individual's previous shopping history, a budget that can be managed by the individual or some other third party, statistical shopping data corresponding to other customers within the individual's demographic, statistical data corresponding to customers within a particular geographical region, actual items being added during the individual's visit to the store, etc. In some examples, a budget associated with the preauthorized limit is updated after each purchase the individual makes. In one example, when an individual interacts with a proximity locator, as described in step 101, the computation of the preauthorized limit is automatically initiated.

In step 105, an authorization of a payment amount is received corresponding to the preauthorized limit computed in step 103. In one example, the enterprise may communicate with the individual's financial institution in order to authorize, or set aside, a specific amount on the individual's account corresponding to the preauthorized threshold limit.

In step 107, information relating to the products and/or services the individual wishes to purchase is received at an electronic scanning device. The product information may be received, for example, using a mobile scanning device that the individual may carry with them throughout the store, or by scanning products at a point of sale location or scanning terminal within a store. In some examples, the electronic scanning device includes an RFID reader, a barcode reader, a QR code reader, Bluetooth detector, low energy Bluetooth detector, wand scanner, integrated-circuit chip reader, tunnel scanning device, or a NFC reader. Scanning the product information creates a balance or tab for the individual that, as discussed above, remains open until the individual approves or denies the final transaction. Once items have been scanned and added to the individual's balance, the balance information may be stored in a database until the transaction is finally approved.

In step 109, the total cost of products or services, is compared to the preauthorized limit in order to verify whether the total cost is authorized. In one example, the total cost or balance information of all the products or services the individual wishes to purchase is stored in a database along with the preauthorized limit computed in step 103. Once items are added to the balance and the total cost is updated, a processor may compare the total cost with the preauthorized limit in order to determine whether the products or services are authorized and whether the total cost is verified.

In step 111, a GUI is rendered on an electronic display device that allows an individual to view their balance and approve or decline the transaction. The electronic display device can be, for example, a point of sale terminal, self-checkout station, payment kiosk, or any other display device that allows a user to view and approve a transaction. The GUI displays an indication of the verified cost of the products or services the individual wishes to pay for. The GUI also displays a graphical prompt requesting approval from the individual of the cost of the products or services.

In some examples, the GUI may also display the preauthorized limit computed in step 103, as well as an indication of whether the cost of the products or services to be purchased exceeds the preauthorized limit. In instances where the individual uses a mobile scanning device to input information relating to products or services, the scanning device can communicate with the electronic display device in order to transmit the individual's balance information, which is then displayed via the GUI.

In step 113, the GUI receives an approval from the individual of the cost of the products or services to be purchased, thus finalizing the transaction. In some examples, the GUI can display a graphical button or control feature that allows a user to approve or decline a transaction in a single action. In other examples, a keypad or other user input device allows the individual to approve or decline the payment. The electronic display device and the electronic scanning device may be incorporated, for example, into a single checkout station such that an individual may scan items, as discussed in step 107, and interact with the GUI, described in steps 111 and 113, at a single location.

Figure 2:
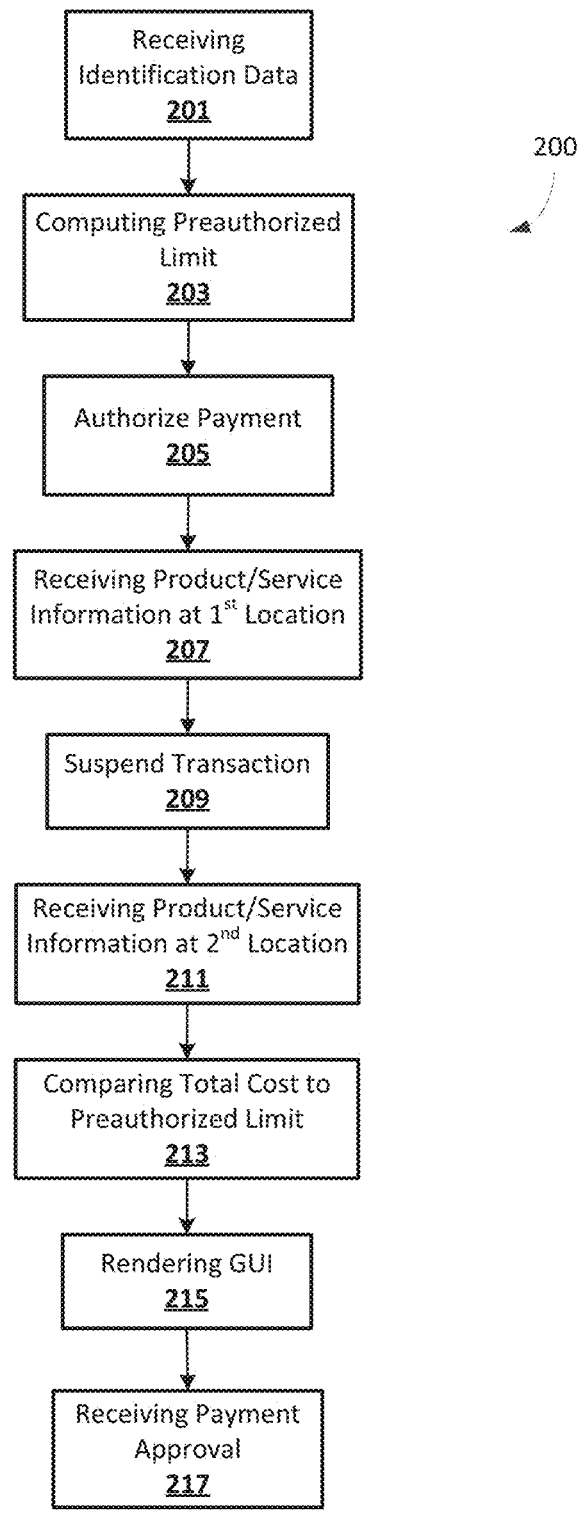
FIG. 2 is a flowchart illustrating another exemplary method of configuring a graphical user interface of an electronic display device, according to embodiments of the present disclosure.

FIG. 2 is a flowchart illustrating an example method 200 for configuring a graphical user interface of an electronic display device to facilitate preauthorized purchasing of products or services within an enterprise, according to embodiments of the present disclosure. In step 201, data indicative of identification information associated with an individual or customer is received at a user-machine interface. The user-machine interface may utilize an IR reader, wireless access point, RFID reader, magnetic card reader, QR code reader, biometric scanner, near field communication (NFC) detector, Bluetooth detector, low energy Bluetooth detector, wand scanner, integrated-circuit chip reader, or geolocation device, etc. The user-machine interface may receive data indicative of identification information associated with an individual via a proximity locator that can detect an electronic marker associated with the individual. In one example, the electronic marker and proximity locator may utilize one or more of the technologies described in reference to the user-machine interface.

Once an individual customer has been identified, in step 203 a preauthorized limit is computed corresponding to the individual and based on the identification information received in step 201. The preauthorized limit can be computed based on, for example, the individual's previous shopping history, a budget that can be managed by the individual or some other third party, statistical shopping data corresponding to other customers within the individual's demographic, statistical data corresponding to customers within a particular geographical region, actual items being added during the individual's visit to the store, etc. In some examples, a budget associated with the preauthorized limit is updated after each purchase the individual makes.

In step 205, an authorization of a payment amount is received corresponding to the preauthorized limit computed in step 203. In one example, the enterprise may communicate with the individual's financial institution in order to authorize, or set aside, a specific amount on the individual's account corresponding to the preauthorized threshold limit.

In step 207, information relating to the products and/or services the individual wishes to purchase is received at an electronic scanning device at a first location within the enterprise. This first location may be, for example, a gas station or food court where an individual would normally need to pay for each transaction individually. However, as discussed above, the techniques disclosed herein allow a user to add products or services to their balance from various departments within an enterprise by scanning products, barcodes, etc. associated with products or services. The product or service information may be received, for example, using a mobile scanning device that the individual may carry with them throughout the store, or by scanning products at a point of sale location or scanning terminal within a store. In some examples, the electronic scanning device includes an RFID reader, a barcode reader, a QR code reader, Bluetooth detector, low energy Bluetooth detector, wand scanner, integrated-circuit chip reader, tunnel scanning device, or a NFC reader. As discussed above, once items have been scanned and added to the individual's balance, the balance information may be stored in a database until the transaction is finally approved.

In step 209, once the individual has finished entering product or service information at the first location, the transaction is suspended for a period of time. However, the preauthorized limit remains open such that the individual can continue to add products or services to their balance or tab.

In step 211, information relating to the products and/or services the individual wishes to purchase is received at an electronic scanning device at a second location within the enterprise. As discussed above, the preauthorized limit remains open after the individual enters information relating to products and/or services at the first location, such that the individual can add more products and/or services to their balance at another location. When an individual scans or otherwise enters information relating to products or services at one location, a database query may be initiated requesting information related to other products or services the individual may have scanned at other point of sale terminals within the enterprise. This allows newly scanned items to be added to the individual's balance. Thus, an individual can approve payment for products from distinct departments within an enterprise at a single location without needing to remove their payment means at each department. The product or service information may be received in the same or similar manner described with reference to step 207.

In step 213, the total cost of products or services is compared to the preauthorized limit in order to verify whether the total cost is authorized. In one example, the total cost, or balance information, of all the products or services the individual wishes to purchase is stored in a database along with the preauthorized limit computed in step 203. Once items are added to the balance, as described in steps 207 and 211, and the total cost is updated, a processor may compare the total cost with the preauthorized limit in order to determine whether the products or services are authorized and whether the total cost is verified.

In step 215, a GUI is rendered on an electronic display device that allows an individual to view their balance and approve or decline the transaction. The electronic display device can be, for example, a point of sale terminal, self-checkout station, payment kiosk, or any other suitable display device that allows an individual to view and approve a transaction. The GUI displays an indication of the verified cost of the products or services the individual wishes to pay for. The GUI also displays a graphical prompt requesting approval from the individual of the cost of the products or services. In some examples, the GUI may also display the preauthorized limit computed in step 203, as well as an indication of whether the cost of the products or services to be purchased exceeds the preauthorized limit. In instances where the individual uses a mobile scanning device to input information relating to products or services, the scanning device can communicate with the electronic display device in order to transmit the individual's balance information, which is then displayed via the GUI.

In step 217, the GUI receives an approval from the individual of the cost of the products or services to be purchased, thus finalizing the transaction. In some examples, the GUI can display a graphical button or control feature that allows a user to approve or decline a transaction in a single action. In other examples, a keypad or other user input device allows the individual to approve or decline the payment. The electronic display device described in steps 215 and 217 can be incorporated, for example, into a single checkout station associated with the first electronic scanning device described in step 207 and/or the second electronic scanning device described in step 211.

Figure 3:
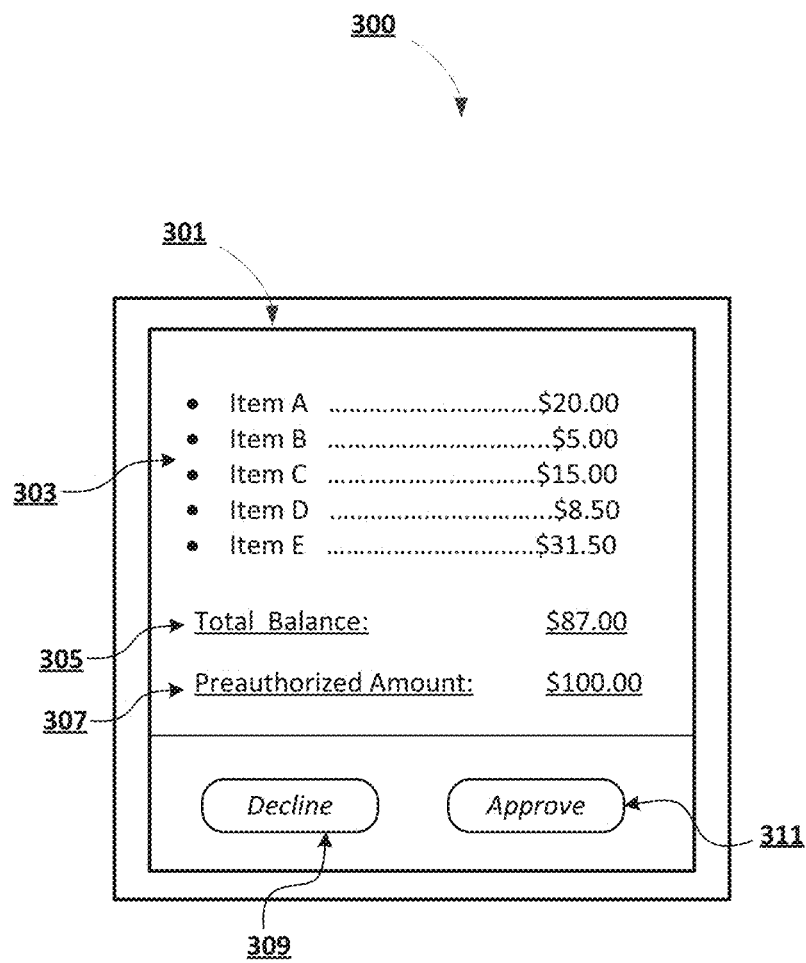
FIG. 3 depicts an exemplary screenshot of a graphical user interface, according to embodiments of the present disclosure.

FIG. 3 shows an example electronic display device 300 for rendering and configuring a graphical user interface 301 to facilitate the preauthorized payment of products and/or services within an enterprise, according to embodiments of the present disclosure. As can be seen, the GUI 301 includes an itemized list 303 representing each product or service that the individual wishes to pay for, along with its corresponding price. In this particular example, the GUI displays the total balance 305 for this particular shopping trip, as well as the preauthorized limit 307. The GUI 301 also includes control feature or graphical prompt 309 that allows the individual to decline the transaction, and control feature or graphical prompt 311 that allows the individual to approve the transaction. In various examples, the control features 309 and 311 can be touchscreen buttons, physical buttons on a keypad, or any other suitable user input means. As discussed above, once an individual has scanned or otherwise input identification data relating to the products or services they wish to purchase, the payment may be completed with a single approval command via the GUI.

Figure 4:
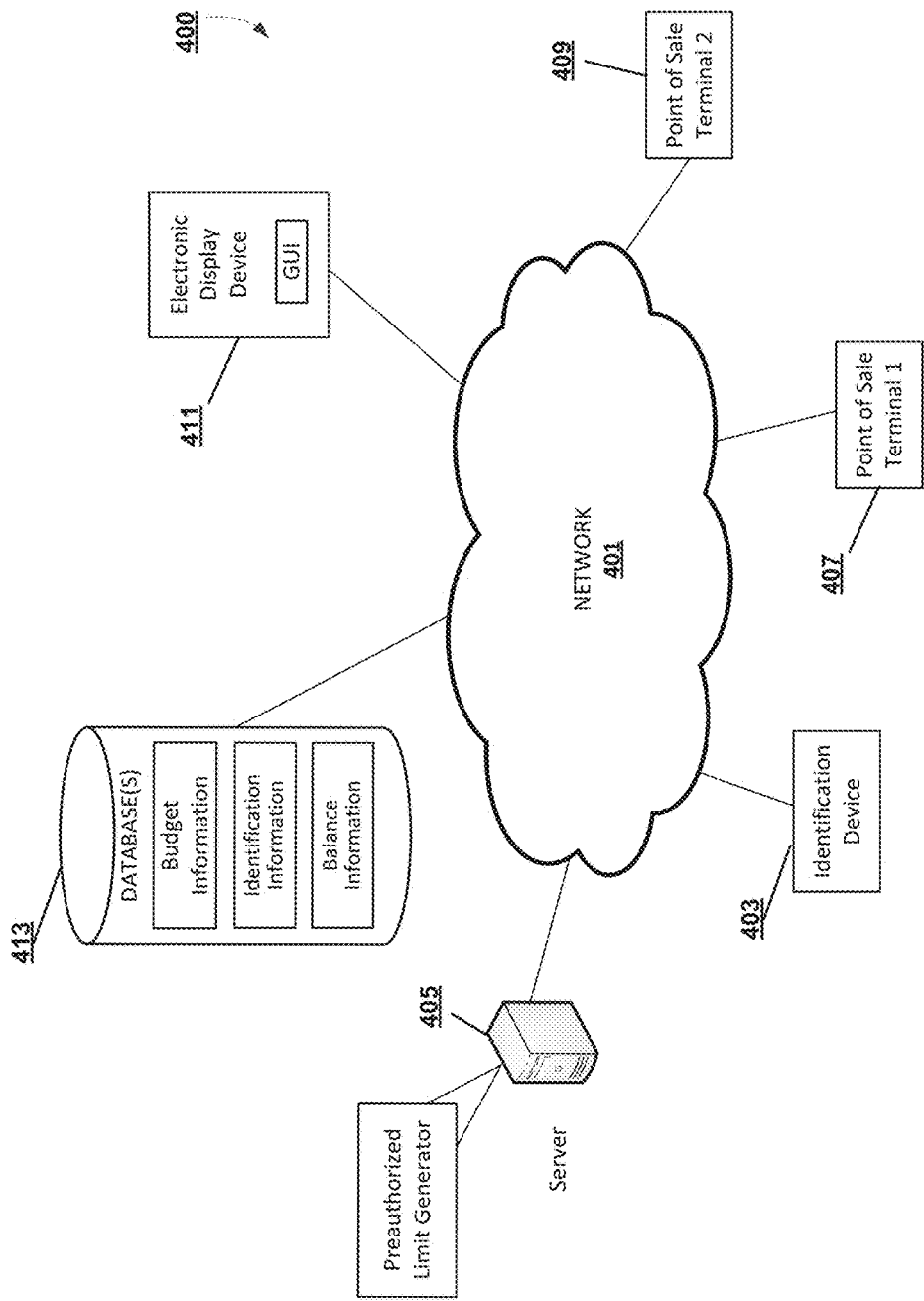
FIG. 4 is a diagram of an exemplary network environment suitable for a distributed implementation of exemplary embodiments of the present disclosure.

FIG. 4 is a diagram of an exemplary network environment 400 suitable for a distributed implementation of exemplary embodiments. The network environment 400 can include one or more servers 405, one or more identification devices 403 for receiving data indicative of identification information associated with an individual, one or more point of sale terminals 407 and 409 for receiving information associated with one or more products or services to be purchased by the individual. As will be appreciated, various distributed or centralized configurations may be implemented, and in some embodiments a single server can be used. Similarly, the identification devices 403, point of sale terminals 407 and 409, and electronic display device may be incorporated into a single terminal. The network environment may also include a database 413, associated with server 405. In exemplary embodiments, the database 413 can store the budget information, identification information, balance information, or other data described herein; while the server 405 can store a preauthorized limit generator which can implement one or more of the processes described herein with respect to FIGS. 1 and 2. The electronic display device 411 may display a GUI to a user as described above in reference to FIG. 3. Once the display device 411 receives instructions from the server 405, the GUI may be rendered to allow an individual to interact with the servers to implement embodiments of the preauthorized payment techniques disclosed herein.

In exemplary embodiments, the server 405, database 413, identification device 403, point of sale terminals 407 and 409, and the electronic display device 411 may be in communication with each other via a communication network 401. The communication network 401 may include, but is not limited to, the Internet, an intranet, a LAN (Local Area Network), a WAN (Wide Area Network), a MAN (Metropolitan Area Network), a wireless network, an optical network, and the like. In exemplary embodiments, the electronic display device 411, point of sale terminals 407 and 409, and the identification device 403 are in communication with the server 405 and database 413 and can generate and transmit database queries requesting information from the raw data matrices or database 413. The server 405 can transmit instructions to the electronic display device 411 over the communication network 401. The server 405 can interact with the electronic display device 411 and database 413 over communication network 401 to render the GUI, e.g., shown in FIG. 3, on the electronic display device 411, as described above in reference to FIGS. 1-2.

Figure 5:
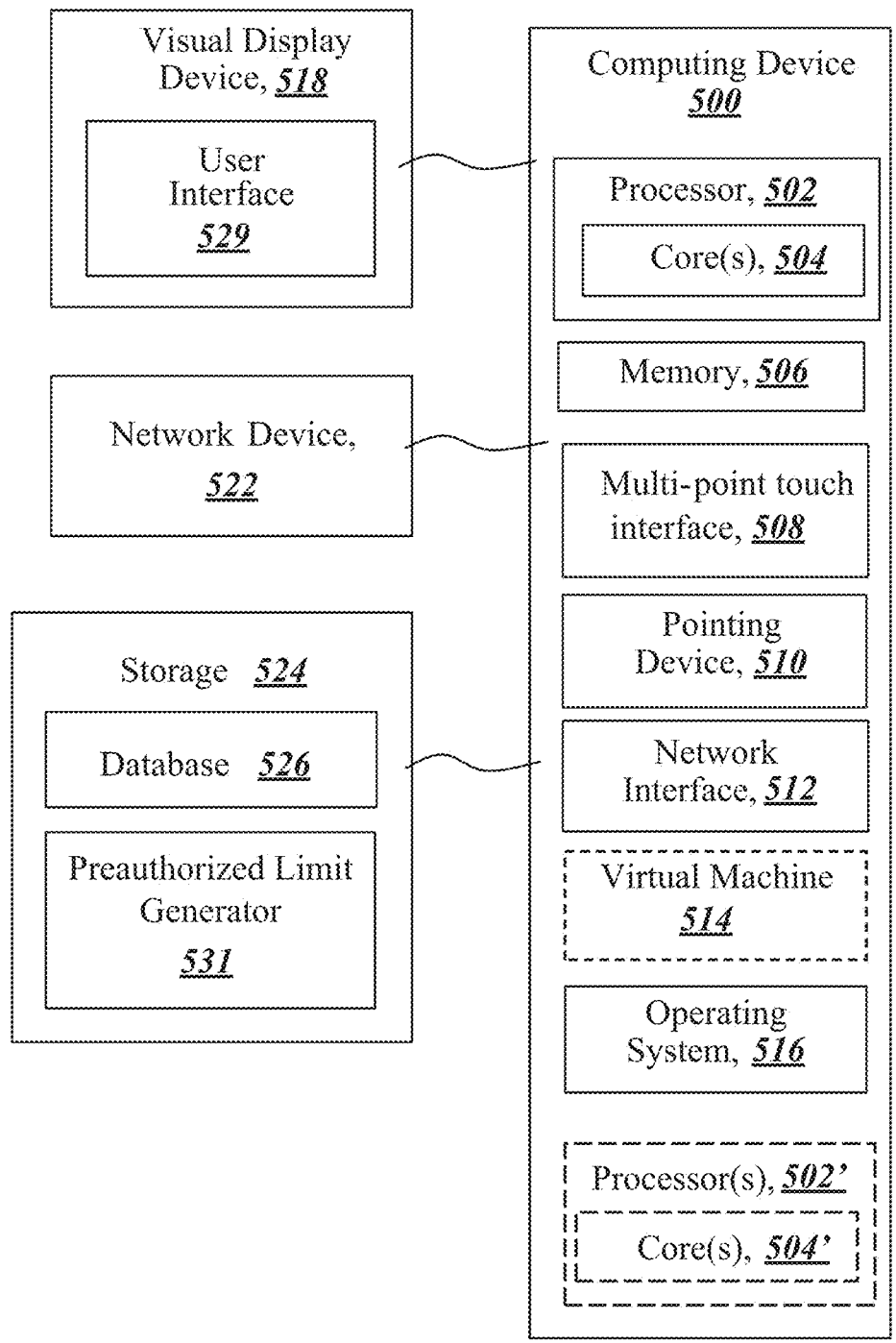
FIG. 5 is a block diagram of an exemplary computing device that can be used to perform exemplary processes in accordance with exemplary embodiments of the present disclosure.

FIG. 5 is a block diagram of an exemplary computing device 500 that can be used in the performance of any of the example methods according to the principles described herein. The computing device 500 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like. For example, memory 506 included in the computing device 500 can store computer-readable and computer-executable instructions or software for implementing exemplary embodiments, such as a preauthorized limit generator 531 programmed to perform processes described herein. The computing device 500 also includes processor 502 and associated core 504, and optionally, one or more additional processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' can each be a single core processor or multiple core (504 and 504') processor.

Virtualization can be employed in the computing device 500 so that infrastructure and resources in the computing device can be shared dynamically. A virtual machine 514 can be provided to handle a process running on multiple processors so that the process appears to be using only one computing resource rather than multiple computing resources. Multiple virtual machines can also be used with one processor.

Memory 506 can be non-transitory computer-readable media including a computer system memory or random access memory, such as DRAM, SRAM, EDO RAM, and the like. Memory 506 can include other types of memory as well, or combinations thereof.

A user can interact with the computing device 500 through a visual display device 518, such as a touch screen display or computer monitor, which can display one or more user interfaces 529 that can be provided in accordance with exemplary embodiments, for example, the exemplary interface illustrated in FIG. 3. The computing device 300 can include other I/O devices for receiving input from a user, for example, a keyboard or any suitable multi-point touch interface 508, a pointing device 510 (e.g., a pen, stylus, mouse, or trackpad). The keyboard 508 and the pointing device 510 can be coupled to the visual display device 518. The computing device 500 can include other suitable conventional I/O peripherals.

The computing device 500 can also include one or more storage devices 524, such as a hard-drive, CD-ROM, or other non-transitory computer readable media, for storing data and computer-readable instructions and/or software, such as the preauthorized limit generator 531, which may generate user interface 529 that implements exemplary embodiments of the methods and systems as taught herein, or portions thereof. Exemplary storage device 524 can also store one or more databases 526 for storing any suitable information required to implement exemplary embodiments. The databases can be updated by a user or automatically at any suitable time to add, delete or update one or more items in the databases. Exemplary storage device 524 can store one or more databases 526 for storing budget information, identification information, balance information, and any other data/information used to implement exemplary embodiments of the systems and methods described herein.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 can include a built-in network adapter, network interface card, PCMCIA network card, card bus network adapter, wireless network adapter, USB network adapter, modem or any other device suitable for interfacing the computing device 500 to any type of network capable of communication and performing the operations described herein. Moreover, the computing device 500 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 500 can run any operating system 516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 516 can be run in native mode or emulated mode. In an exemplary embodiment, the operating system 516 can be run on one or more cloud machine instances In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A method for configuring a graphical user interface of an electronic display, the method comprising:
    receiving, via a user-machine interface, identification information associated with an individual;
    dynamically computing, using a processor, an active preauthorized limit corresponding to the individual, based on the identification information, the active preauthorized limit being computed based on the identification information received via the user-machine interface;
    receiving authorization of a payment amount corresponding to the active preauthorized limit;
    receiving, via an electronic scanning device, information associated with one or more products or services;
    comparing, using the processor, a total cost of the one or more products or services to the active preauthorized limit, to verify an authorized status of the total cost of the one or more products or services to provide a verified cost; and
    rendering a graphical user interface on an electronic display of a mobile communication device, the graphical user interface including an indication of the verified cost of the one or more products or services having the authorized status, and a graphical prompt requesting approval from the individual of the verified cost of the one or more products or services.

2. The method of claim 1, further comprising receiving, via the graphical user interface, an approval from the individual of the verified cost of the one or more products or services.

3. The method of claim 1, wherein receiving information associated with the one or more products or services includes receiving information at multiple electronic scanning devices located at distinct point of sale terminals within an enterprise.

4. The method of claim 3, wherein receiving information associated with the one or more products or services at one point of sale terminal initiates a database query requesting information associated with products or services scanned at other point of sale terminals within the enterprise.

5. The method of claim 1, wherein the user-machine interface includes an IR reader, wireless access point, RFID reader, magnetic card reader, QR code reader, biometric scanner, NFC detector, Bluetooth detector, low energy Bluetooth detector, wand scanner, integrated-circuit chip reader, or geolocation device.

6. The method of claim 1, wherein the electronic scanning device includes an RFID reader, a barcode reader, a QR code reader, Bluetooth detector, low energy Bluetooth detector, wand scanner, integrated-circuit chip reader, tunnel scanning device, or a NFC reader.

7. The method of claim 1, wherein the active preauthorized limit is calculated based on the individual's previous shopping history or a preset budget created by the individual.

8. The method of claim 1, wherein receiving identification information associated with the individual automatically initiates the computation of the active preauthorized limit.

9. The method of claim 8, wherein the preset budget is updated after each purchase made by the individual.

10. The method of claim 1, wherein the graphical user interface further comprises an indication of whether the cost of the one or more products or services exceeds the active preauthorized limit.

11. The method of claim 1, wherein the user-machine interface receives identification information associated with the individual by detecting a proximity of an electronic marker of the individual to a proximity locator.

12. The method of claim 1, wherein the mobile communication device is a smartphone.

13. A system of configuring a graphical user interface of an electronic display, the system comprising:
    one or more servers programmed to:
        receive, via a user-machine interface, identification information associated with an individual based on a proximity of an electronic marker of the individual to a proximity locator;
        dynamically compute an active preauthorized limit corresponding to the individual based on the identification information, the active preauthorized limit being computed based on the identification information received via the user-machine interface;
        receive authorization of a payment amount corresponding to the active preauthorized limit;
        receive, via an electronic scanning device, information associated with one or more products or services; and
        compare a total cost of the one or more products or services to the active preauthorized limit, to verify an authorized status of the total cost of the one or more products or services to provide a verified cost; and
    an electronic display of a mobile communication device programmed to:
        render a graphical user interface including an indication of the verified cost of the one or more products or services having the authorized status, and a graphical prompt requesting approval from the individual of the verified cost of the one or more products or services.

14. The system of claim 13, wherein the electronic display of the mobile communication device is further programmed to receive, via the graphical user interface, an approval from the individual of the verified cost of the one or more products or services.

15. The system of claim 13, wherein receiving information associated with the one or more products or services includes receiving information at multiple electronic scanning devices located at distinct point of sale terminals within an enterprise.

16. The system of claim 15, wherein receiving information associated with the one or more products or services at one point of sale terminal initiates a database query requesting information associated with products or services scanned at other point of sale terminals within the enterprise.

17. The system of claim 13, wherein the user-machine interface includes an IR reader, wireless access point, RFID reader, magnetic card reader, QR code reader, biometric scanner, NFC detector, Bluetooth detector, low energy Bluetooth detector, wand scanner, integrated-circuit chip reader, or geolocation device.

18. The system of claim 13, wherein the electronic scanning device includes an RFID reader, a barcode reader, a QR code reader, Bluetooth detector, low energy Bluetooth detector, wand scanner, integrated-circuit chip reader, tunnel scanning device, or a NFC reader.

19. The system of claim 13, wherein the active preauthorized limit is calculated based on the individual's previous shopping history or a preset budget created by the individual.

20. The system of claim 13, wherein receiving identification information associated with the individual automatically initiates the computation of the active preauthorized limit.

21. The system of claim 20, wherein the preset budget is updated after each purchase made by the individual.

22. The system of claim 13, wherein the graphical user interface further comprises an indication of whether the cost of the one or more products or services exceeds the active preauthorized limit.

23. The system of claim 13, wherein the user-machine interface receives identification information associated with the individual by detecting a proximity of an electronic marker of the individual to a proximity locator.

24. The system of claim 13, wherein the mobile communication device is a smartphone.

25. A non-transitory computer readable medium storing instructions executable by a processing device, wherein execution of the instructions causes the processing device to implement a method of configuring a graphical user interface of an electronic display, the method comprising:
    receiving, via a user-machine interface, identification information associated with an individual based on a proximity of an electronic marker of the individual to a proximity locator;
    dynamically computing, using a processor, an active preauthorized limit corresponding to the individual, based on the identification information, the active preauthorized limit being computed based on the identification information received via the user-machine interface;
    receiving authorization of a payment amount corresponding to the active preauthorized limit;
    receiving, via an electronic scanning device, information associated with one or more products or services;
    comparing, using the processor, a total cost of the one or more products or services to the active preauthorized limit, to verify an authorized status of the verified cost of the one or more products or services; and
    rendering a graphical user interface on an electronic display of a mobile communication device, the graphical user interface including an indication of the verified cost of the one or more products or services having the authorized status, and a graphical prompt requesting approval from the individual of the verified cost of the one or more products or services.

26. The non-transitory computer readable medium of claim 25, wherein the graphical user interface is further programmed to receive an approval from the individual of the verified cost of the one or more products or services.

27. The non-transitory computer readable medium of claim 25, wherein receiving information associated with the one or more products or services includes receiving information at multiple electronic scanning devices located at distinct point of sale terminals within an enterprise.

28. The non-transitory computer readable medium of claim 27, wherein receiving information associated with the one or more products or services at one point of sale terminal initiates a database query requesting information associated with products or services scanned at other point of sale terminals within the enterprise.

29. The non-transitory computer readable medium of claim 25, wherein the user-machine interface includes an IR reader, wireless access point, RFID reader, magnetic card reader, QR code reader, biometric scanner, NFC detector, Bluetooth detector, low energy Bluetooth detector, wand scanner, integrated-circuit chip reader, or geolocation device.

30. The non-transitory computer readable medium of claim 25, wherein the electronic scanning device includes an RFID reader, a barcode reader, a QR code reader, Bluetooth detector, low energy Bluetooth detector, wand scanner, integrated-circuit chip reader, tunnel scanning device, or a NFC reader.

31. The non-transitory computer readable medium of claim 25, wherein the active preauthorized limit is calculated based on the individual's previous shopping history or a preset budget created by the individual.

32. The non-transitory computer readable medium of claim 25, wherein receiving identification information associated with the individual automatically initiates the computation of the active preauthorized limit.

33. The non-transitory computer readable medium of claim 32, wherein the preset budget is updated after each purchase made by the individual.

34. The non-transitory computer readable medium of claim 25, wherein the graphical user interface further comprises an indication of whether the cost of the one or more products or services exceeds the active preauthorized limit.

35. The non-transitory computer readable medium of claim 25, wherein the user-machine interface receives identification information associated with the individual by detecting a proximity of an electronic marker of the individual to a proximity locator.

36. The non-transitory computer readable medium of claim 25, wherein the mobile communication device is a smartphone.

37. A system of configuring a graphical user interface of an electronic display, the system comprising:
    means for receiving identification information associated with an individual;
    means for dynamically computing an active preauthorized limit corresponding to the individual, based on the identification information associated with the individual, the active preauthorized limit being computed based on the identification information received via the user-machine interface; and
    means for receiving authorization of a payment amount corresponding to the active preauthorized limit;
    means for receiving information associated with one or more products or services;
    means for comparing a total cost of the one or more products or services to the active preauthorized limit to verify an authorized status of the total cost of the one or more products or services to provide a verified cost; and
    means for rendering a graphical user interface on an electronic display of a mobile communication device, the graphical user interface including an indication of the verified cost of the one or more products or services having the authorized status, and a graphical prompt requesting approval from the individual of the verified cost of the one or more products or services.

\* \* \* \* \*